United States Patent [19]
Yasuda

[11] Patent Number: 5,429,428
[45] Date of Patent: Jul. 4, 1995

[54] DETERMINING APPROPRIATE WHEEL SPEEDS TO BE USED FOR TRACTION CONTROL

[75] Inventor: Sota Yasuda, Yokohama, Japan

[73] Assignee: Nissan Motor Co., Ltd., Yokohama, Japan

[21] Appl. No.: 74,745

[22] Filed: Jun. 10, 1993

[30] Foreign Application Priority Data

Jun. 26, 1992 [JP] Japan .................. 4-169120

[51] Int. Cl.$^6$ .............................................. B60T 8/48
[52] U.S. Cl. ...................................... 303/103; 180/197
[58] Field of Search ............... 303/93, 95, 97, 100, 303/103, 105, 110, 113.2, 113.3; 180/197; 364/426.02, 426.03, 426.04

[56] References Cited

U.S. PATENT DOCUMENTS

| | | | |
|---|---|---|---|
| 5,124,922 | 6/1992 | Akiyama | 180/197 X |
| 5,213,177 | 5/1993 | May | 180/197 |
| 5,255,193 | 10/1993 | Katayose et al. | 303/103 X |
| 5,279,382 | 1/1994 | Iwata | 180/197 |

FOREIGN PATENT DOCUMENTS 1-138333  5/1989  Japan .

*Primary Examiner*—Josie A. Ballato
*Attorney, Agent, or Firm*—Foley & Lardner

[57] ABSTRACT

An apparatus for determining wheel slippage which may be utilized for traction control of an automotive vehicle is provided. This apparatus determines a compliance wheel speed difference between right and left compliance wheels. When the compliance wheel speed difference is smaller than a preselected threshold value, a compliance wheel reference speed is determined by averaging right and left compliance wheel speeds, when it is greater than the preselected threshold value, the compliance wheel reference speed is determined based on a greater one of the right and left compliance wheel speeds. The apparatus determines a degree of the wheel slippage based on a difference between the compliance wheel reference wheel and a driven wheel speed.

5 Claims, 4 Drawing Sheets

DETERMINING APPROPRIATE WHEEL SPEEDS TO BE USED FOR TRACTION CONTROL

BACKGROUND OF THE INVENTION

1. Field of the Invention

The present invention relates generally to a traction control system for an automotive vehicle which controls throttling and/or braking operations to modify driving forces transmitted to driven wheels upon occurrence of wheel slippage during acceleration. More particularly, the invention relates to an improved arrangement for determining a degree of wheel slippage which may be utilized for traction control of an automotive vehicle.

2. Description of the Prior Art

Japanese Patent First Publication No. 1-138333 discloses a traction control system for an automotive vehicle. This traction control system corrects right and left compliance wheel speeds respectively based on previous speed data detected in a preceding program cycle and current speed data to determine an average value of the corrected right and left compliance wheel speeds. Based on a difference between the average value of the compliance wheel speeds and driven wheel speed, wheel slippage during acceleration is determined. When the driven wheels slip, the system performs throttling control to reduce engine power so that the wheel slippage is restricted to resume traction of the driven wheels against a road surface.

However, in the above prior art traction control system, when failure occurs in either one of wheel speed sensors of the right and left compliance wheels due to wire breakage or short circuit, for example, a wheel speed value output from the defective sensor will become substantially zero, resulting in the average value of the right and left compliance wheel speeds being decreased greatly, which will cause the wheel slippage to be determined to be much greater than an actual wheel slippage. Thus, the system reduces driving force undesirably, degrading acceleration characteristics.

For avoiding the above drawback, a greater one of the right and left compliance wheel speeds may be used to determine a compliance wheel reference speed. This, however, encounters a drawback in that even when the sensors are normally operating, the compliance wheel reference speed may become too great due to the difference in turning radius between inside and outside wheels, noise input to the sensors, or the difference in diameter between right and left tires such as when a tempa space tire is mounted on one of the wheels, an mount of wear is different between the tires, or one of the tires is punctured.

SUMMARY OF THE INVENTION

It is therefore a principal object of the present invention to avoid the disadvantages of the prior art.

It is another object of the invention to provide an arrangement for determining a wheel slippage value during acceleration which may be utilized to perform traction control properly even when one of the wheel speed sensors of a right or left compliance wheel breaks down.

According to one aspect of the present invention, there is provided an apparatus for determining a wheel slippage value utilized for traction control of an automotive vehicle which comprises a compliance wheel speed determining means for determining wheel speeds of right and left compliance wheels respectively, a driven wheel speed determining means for determining wheel speed of a driven wheel, a compliance wheel speed difference determining means for determining a compliance wheel speed difference between the right and left compliance wheels based on the right and left compliance wheel speeds determined by the compliance wheel speed determining means, and a wheel slippage determining means for determining a compliance wheel reference speed based on a greater one of the wheel speeds of the right and left compliance wheels when the compliance wheel speed difference determined by the compliance wheel speed difference determining means is greater than a preselected threshold value, the wheel slippage determining means determining the wheel slippage value based on the compliance wheel reference speed and the wheel speed of the driven wheel determined by the driven wheel speed determining means.

Accordingly, with the above arrangements, even when either one of the right and left compliance wheel speeds represents a value greatly different from the other due to a malfunction of the compliance wheel speed determining means such as wire breakage or short circuit, a proper compliance wheel reference speed may be assured.

In the preferred mode, the compliance wheel reference speed may be determined based on either an average value of the right and left compliance wheel speeds or a smaller one of the right and left compliance wheel speeds when the compliance wheel speed difference is smaller than the preselected threshold value.

The driven wheel speed determining means may include right and left driven wheel speed sensors for detecting right and left driven wheel speeds respectively. The wheel slippage determining means determines tile wheel slippage value based on the compliance wheel reference speed and a driven wheel speed which is determined by averaging the right and left driven wheel speeds.

According to another aspect of the present invention, there is provided a traction control system for an automotive vehicle which comprises a compliance wheel speed determining means for determining wheel speeds of right and left compliance wheels respectively, a driven wheel speed determining means for determining wheel speed of a driven wheel, a compliance wheel speed difference determining means for determining a wheel speed difference between the right and left compliance wheels based on the right and left compliance wheel speeds determined by the compliance wheel speed determining means, a wheel slippage determining means for determining a compliance wheel reference speed based on a greater one of the wheel speeds of the right and left compliance wheels when the wheel speed difference determined by the compliance wheel speed difference determining means is greater than a preselected threshold value, the wheel slippage determining means determining the wheel slippage value based on the compliance wheel reference speed and the wheel speed of the driven wheel determined by the driven wheel speed determining means, and a traction control means for controlling driving force transmitted to the driven wheel so that the wheel slippage value falls in a preselected slippage range.

In the preferred mode, the wheel slippage determining means determines the compliance wheel reference speed based on an average value of the right and left compliance wheel speeds determined by the compliance wheel speed determining means when the compliance wheel speed difference is smaller than the preselected threshold value.

The driven wheel speed determining means includes right and left driven wheel speed sensors for detecting right and left driven wheel speeds respectively. The wheel slippage determining means determines the wheel slippage value based on the compliance wheel reference speed and a driven wheel speed which is determined by averaging the right and left driven wheel speeds. The traction control means modifies an opening degree of a throttle valve to reduce engine power so that the wheel slippage value falls in the preselected slippage range.

Additionally, the wheel slippage determining means may determine a first wheel slippage value based on the compliance wheel reference speed and the right driven wheel speed and a second wheel slippage value based on the compliance wheel reference speed and the left driven wheel speed. The traction control means modifies braking forces applied to the right and left driven wheels based on the first and second wheel slippage values respectively.

DESCRIPTION OF THE PREFERRED EMBODIMENT

Figure 1:
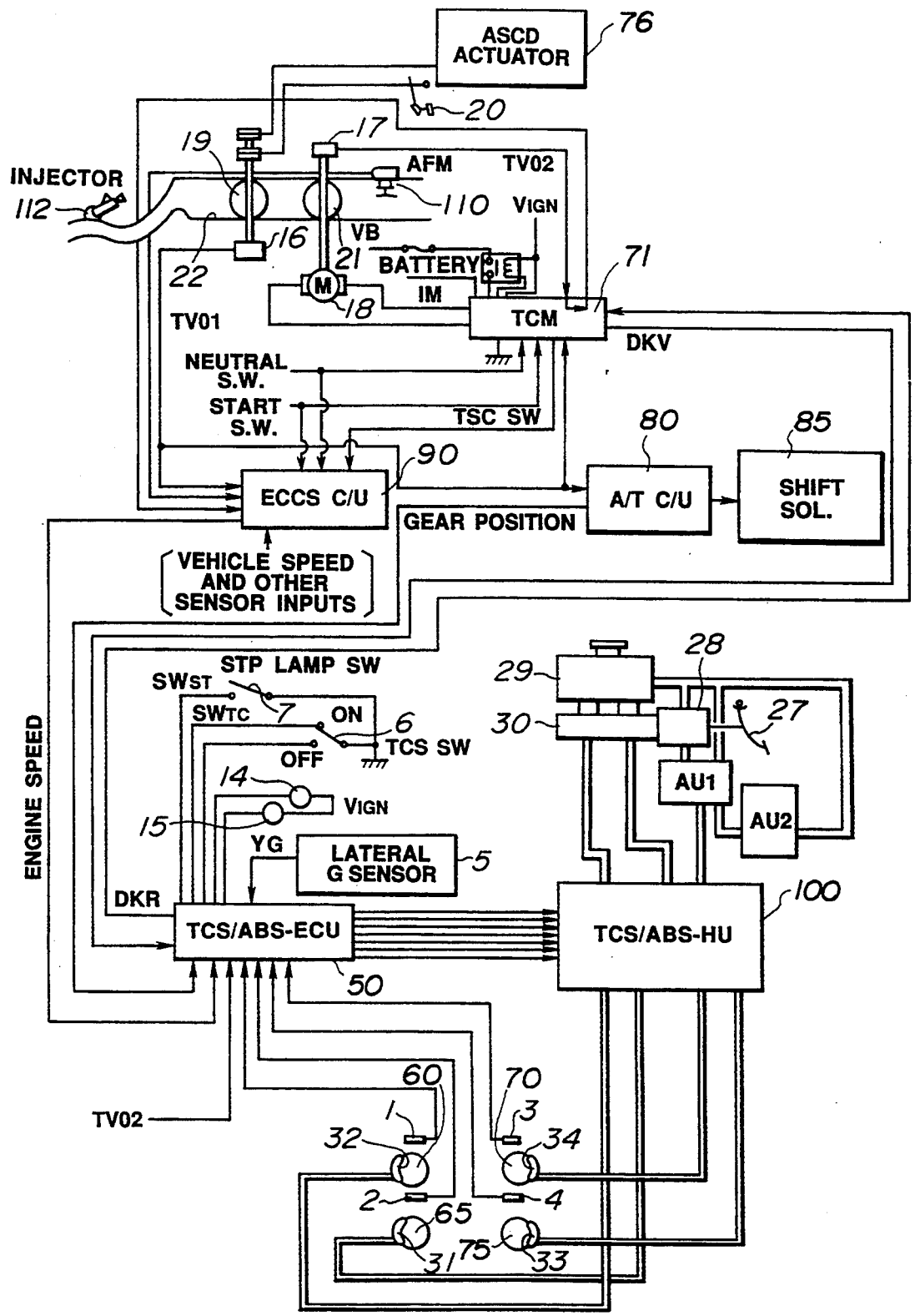
FIG. 1 is a block diagram which shows a traction control system according to the present invention which is incorporated in a rear-wheel drive vehicle.
Figure 2:
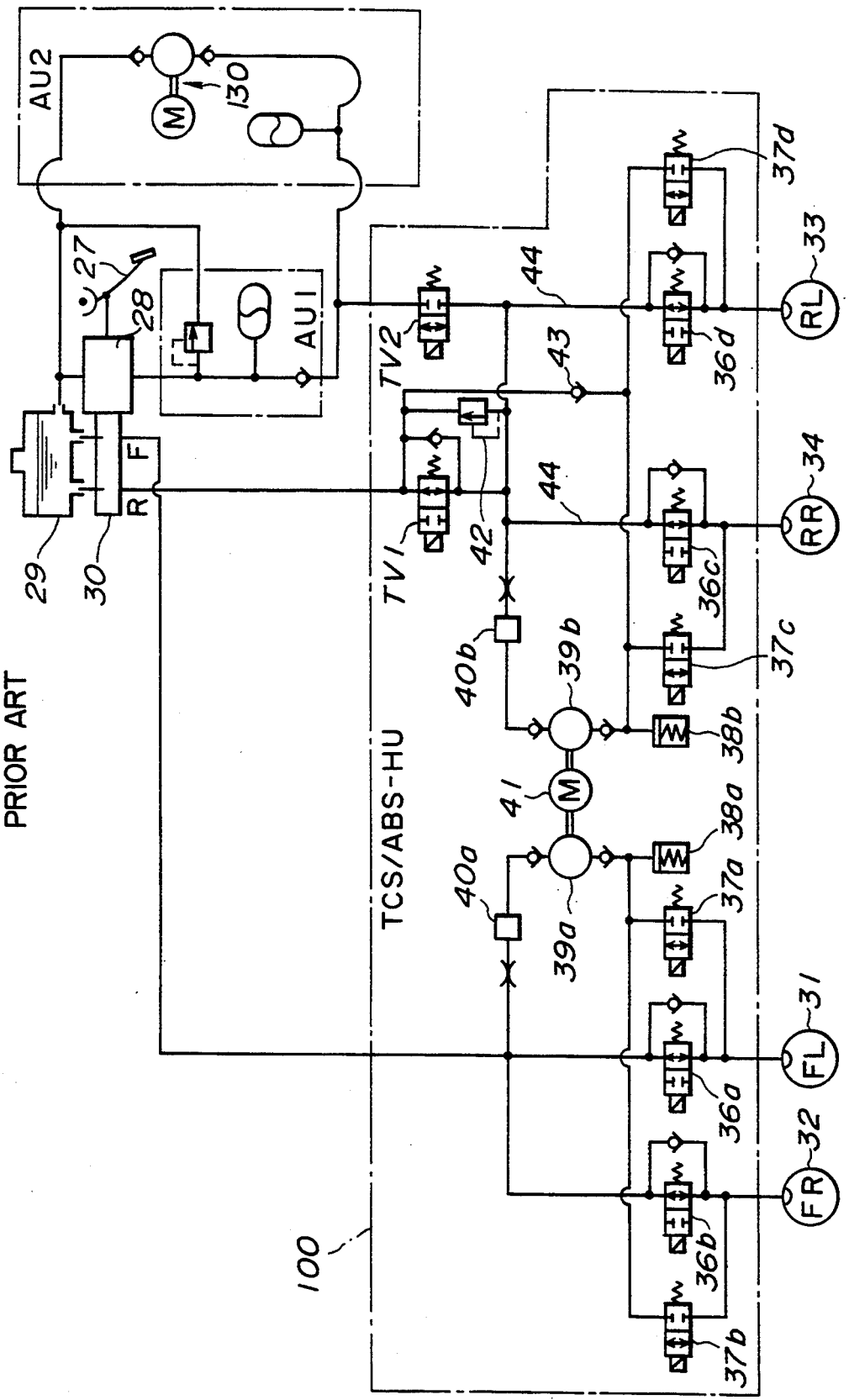
FIG. 2 is a circuit diagram which shows a driving/braking control system of a conventional traction control system.

Referring now to the drawings, particularly to FIGS. 1 and 2, there is shown a traction control system according to the present invention which is incorporated in a rear-wheel drive vehicle. Of course, this traction control system may be applied to a front-wheel drive vehicle.

The traction control system of this embodiment is capable of performing both throttling control (hereinafter referred to as TCS throttle control) and braking control (hereinafter referred to as TCS braking control). The TCS throttle control is such that when wheel slippage is created at a rear-wheel (i.e., driven wheels) during acceleration, an opening degree of a throttle valve is controlled to reduce engine power so that the wheel slippage of the rear wheel is modified to within an optimum allowable range. The TCS braking control is such that braking force which is applied to a skidding driven wheel, either or both of right and left, is increased upon occurrence of wheel slippage during acceleration to reduce the wheel slippage to within the optimum allowable range.

The shown rear-wheel drive vehicle further includes an anti-skid braking control system which controls braking fluid pressure applied to the front and rear wheels for preventing the wheels from being locked during braking operation. The anti-skid braking control system and the traction control system are integrally controlled by a traction control system/anti-skid braking control system electronic control unit 50 (hereinafter referred to as a TCS/ABS-ECU).

The TCS/ABS-ECU 50 receives sensor signals indicating wheel speeds $V_{FR}$, $V_{FL}$, $V_{RR}$, and $V_{RL}$ of the front-right and front-left wheels 60 and 65 and rear-right and rear-left wheels 70 and 75 detected by a front-right wheel speed sensor 1, front-left wheel speed sensor 2, rear-right wheel speed sensor 3, and rear-left wheel speed sensor 4 respectively. The TCS/ABS-ECU 50 further receives a lateral acceleration sensor signal YG from a lateral acceleration sensor 5, a switching signal SWST from a stop lamp switch 7, a first throttle opening signal indicative of an actual opening degree DKV from a throttle control module 71 (TCM), a gear position signal and a shifting up signal from an automatic transmission control unit 80 (AT-CU), an engine speed signal from an electronic concentrated engine control unit 90 (ECCS-CU), and a second throttle opening signal TV02 from a second throttle sensor 17.

The TCS/ABS-ECU 50 is responsive to the above signals to determine a degree of wheel slippage during acceleration to provide a throttle opening control signal indicative of a target throttle opening degree DKR to the throttle control module 71 under the TCS throttle control and provides solenoid control signals to solenoid valves of a hydraulic unit 100 (hereinafter referred to as a TCS/ABS-HU) for modifying a braking fluid pressure level at each wheel under the TCS braking control.

The TCS/ABS-ECU 50 also determines a degree of wheel slippage during deceleration under the anti-skid braking control to provide the solenoid control signals to the solenoid valves of the TCS/ABS-HU 100 respectively for controlling the braking fluid pressure levels for the wheels.

Additionally, the TCS/ABS-ECU 50 provides a lighting command signal to a TCS operative state indicator lamp 15 for indicating that the TCS is in operation.

The throttle control module 71 includes a control circuit for driving a throttle motor 18, and receives a first throttle opening signal TV01 indicative of an actual opening degree of a first throttle valve 19 detected from a first throttle sensor 16 to provide the first throttle opening signal indicative of the actual opening degree DKV to the TCS/ABS-ECU 50, and the second throttle opening signal TV02 detected from the second throttle sensor 17 to provide a motor driving current IM to the throttle motor 18 based on the target throttle opening degree DKR input from the TCS/ABS-ECU 50.

The first throttle sensor 16 is disposed on a supporting shaft of the first throttle valve 19 which is actuated by an acceleration pedal 20. Likewise, the second throttle sensor 17 is attached to a supporting shaft of a second throttle valve 21 which is arranged in series with the first throttle valve 19 in an air induction passage 22 of the engine and controlled by the throttle motor 18 to modify an opening degree thereof.

The traction control system of this embodiment includes peripheral devices such as the electronic concentrated engine control unit 90, an automatic transmission control unit 80, and an automatic speed control unit (not shown).

The electronic concentrated engine control unit 90 is responsive to a signal from an airflow meter 110 to control fuel injection of a fuel injector 112, ignition timing, and idling speed of the engine, and is also responsive to an ON signal from a traction control system switch (TCS SW) 6 indicating that the traction control is in operation to select one of the first and second throttle opening signals TV01 and TV02 which indicates a smaller opening degree for transient characteristic control while deactivating canister control and EGR control.

The automatic transmission control unit 80 is adapted for controlling gear shifting operation and lockup clutch operation, and outputs the gear position signal and the shifting up signal to the TCS/ABS-ECU 50.

The engine control unit 90 also includes an automatic speed control system as its peripheral system. The automatic speed control system employs an automatic speed control device actuator abbreviated as an ASCD actuator 76 which modifies the opening degree of the first throttle valve 19 to maintain a preset constant vehicle speed. The automatic speed control system is responsive to the ON signal from the traction control switch 6 to restrict opening movement of the first throttle valve 19, and also responsive to an OFF signal from the traction control switch 6 to modify closing speed of the first throttle valve 19 gradually.

Referring to FIG. 2, there is shown a hydraulic circuit of a braking fluid pressure control system which is utilized in both the traction control and the anti-skid braking control as described above.

The braking fluid pressure control system includes generally a brake pedal 27, a hydraulic booster 28, a master cylinder 80 with a reservoir tank 29, wheel cylinders 31, 32, 33, and 34, the hydraulic control unit 100, a first accumulator unit AU1 and a second accumulator unit AU2. The first accumulator unit AU1 and the second accumulator unit AU2 are both applied with a hydraulic fluid from a pump unit 130, and serve as hydraulic pressure sources for the hydraulic booster 28 and the TCS braking control respectively, as will be referred to hereinafter in detail.

The hydraulic control unit 100 includes a first directional control valve TV1 of normally open type, a second directional control valve TV2 of normally closed type, a front-left and front-right pressure intensifying valves 36a and 36b, rear-left and rear-right pressure intensifying valves 36c and 36d, front-left and front-right pressure reducing valves 37a and 37b, rear-left and rear-right pressure reducing valves 37c and 37d, front and rear reservoirs 38a and 38b, front and rear pumps 39a and 39b, front and rear damper chambers 40a and 40b, a pump motor 41, relief valve 42, and a check valve 43.

During normal braking operation and the anti-skid braking control, both the first and second directional control valves TV1 and TV2 are deenergized to have valve positions, as shown in the drawing, to introduce hydraulic pressure from the master cylinder 30 into a braking fluid pressure input line 44. Alternatively, when the traction control is employed, both the first and second directional control valves TV1 and TV2 are energized to direct hydraulic pressure from the second accumulator unit AU2 to the braking fluid pressure input line 44.

Additionally, in a pressure intensifying mode of the TCS braking control during normal conditions, the pressure intensifying valves 36c and 36d and the pressure reducing valves 37c and 37d are deenergized in the illustrated positions to elevate pressures in the rear-right and rear-left wheel cylinders 34 and 33. When the pressure supplied to the wheel cylinders 34 and 33 exceeds a preselected level, the relief valve 42 is activated to return the excessive pressure to the master cylinder 30. Alternatively, in a pressure reducing mode of the TCS braking control, the pressure intensifying valves 36c and 36d and the pressure reducing valves 37c and 37d are all energized so that the pressures in the wheel cylinders 33 and 34 are drained to the reservoir 38b and partially returned to the master cylinder 30 through tile check valve 43.

Figure 3:
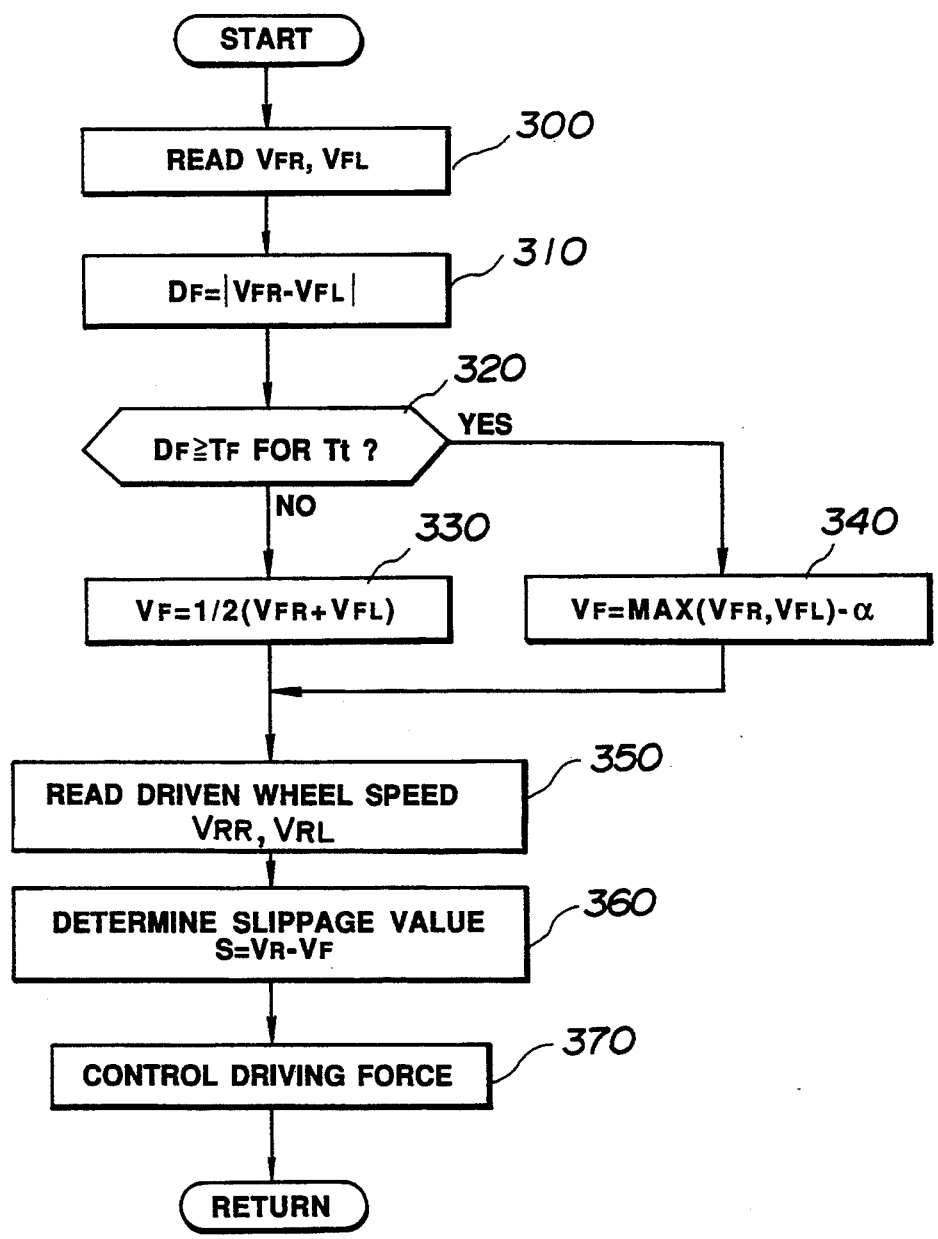
FIG. 3 is a flowchart which shows logical steps performed by a control unit of a traction control system of the invention.

Referring to FIG. 3, there is shown a flowchart of a program or sequence of logical steps performed by the TCS/ABS-ECU 50.

After entering the program, the routine then proceeds to step 300 wherein front-right wheel speed $V_{FR}$ from the front-right wheel speed sensor 1 and the front-left wheel speed $V_{FL}$ from the front-left wheel speed sensor 2 are read. The routine then proceeds to step 310 wherein based on the front-right wheel speed $V_{FR}$ and the front-left wheel speed $V_{FL}$, a compliance wheel speed difference $D_F$ between the front-right and front-left wheels 60 and 65 is determined according to the following relation.

$$D_F = |V_{FR} - V_{FL}|$$

The routine then proceeds to step 320 wherein it is determined whether the compliance wheel speed difference $D_F$ above a preselected threshold value $T_F$ is kept longer than a given period of time $T_t$ or not. This determination is, as will be described hereinafter in detail, made for determining whether failure occurs in either one of the front-right and front-left wheel speed sensors 1 and 2 or not. In addition, the reason for providing time interval of the period of time $T_t$ is that even when large noise is input to the sensors so that the compliance wheel speed difference $D_F$ exceeds the threshold value $T_F$ temporarily, the system will be prevented from mistakenly determining that failure has occurred in the sensor.

If a NO answer is obtained in step 320 concluding that both the wheel speed sensors 1 and 2 are normally operating, the routine then proceeds to step 330 wherein a compliance wheel reference speed $V_F$ is defined by the average of the front-right wheel speed $V_{FR}$ and the front-left wheel speed $V_{FL}$ according to the following relation.

$$V_F = \tfrac{1}{2}(V_{FR} + V_{FL})$$

The compliance wheel reference speed $V_F$ may alternatively be determined based on a smaller one of the front-right and the front-left wheel speeds $V_{FR}$ and $V_{FL}$.

If a YES answer is obtained in step 320 concluding that either one of the front-right or front-left left wheel speed sensors 1 and 2 has broken down, the routine then proceeds to step 340 wherein the compliance wheel reference speed $V_F$ is determined according to the following relation wherein a correction value $\alpha$ is subtracted from a greater one of the front-right wheel speed $V_{FR}$ and the front-left wheel speed $V_{FL}$.

$$V_F = MAX(V_{FR}, V_{FL}) - \alpha$$

It is preferable that the correction value $\alpha$ be set to a constant which corresponds to one-half of a maximum value of the compliance wheel speed difference $D_F$ which may be created during normal operation of the sensors. The correction value a may alternatively be set to a variable which represents about zero when a vehicle is traveling straight and increases according to increase in the compliance wheel speed difference $D_F$ during turning. Prior to step 340, an additional step may be provided for determining whether a vehicle is being turned or not. Only when the vehicle is being turned, the correction value $\alpha$ may be used in the above equation.

After steps 330 or 340, the routine proceeds to step 350 wherein the rear-right wheel speed $V_{RR}$ from the rear-right wheel speed sensor 3 and the rear-left wheel speed $V_{RL}$ from the rear-left wheel speed sensor 4 are read. The routine then proceeds to step 360 wherein a wheel slippage value S is defined by a difference between the compliance wheel reference speed $V_F$ and a driven wheel speed $V_R$ according to the following relation.

$$S = V_R - V_F$$

In the TCS throttle control, the driven wheel speed $V_R$ is given by an average value of the rear-right wheel speed $V_{RR}$ and the rear-left wheel speed $V_{RL}$ to determine a single wheel slippage value S, while in the TCS braking control, two driven wheel speeds $V_R$ are given by the rear-right wheel speed $V_{RR}$ and the rear-left wheel speed $V_{RL}$ respectively to determine right and left wheel slippage values S.

Additionally, in step 360, in place of the wheel slippage value S, a wheel slippage ratio $S_r$ may be determined according to a relation of $S_r = (V_R - V_F)/V_R$.

After step 360, the routine proceeds to step 370 wherein the TCS braking control and the TCS throttle control are carried out based on the corresponding wheel slippage values S, as discussed below.

Under the TCS braking control, when either or both of the right and left wheel slippage values S during acceleration are greater than a preselected slippage threshold value which is determined according to traveling condition parameters such as the lateral acceleration YG detected by the lateral acceleration sensor 5 and vehicle speed, it is determined which braking ranges (i.e., a fine pressure elevation range, a gradual pressure elevation range, a quick pressure elevation range, or a pressure reduction range) right and/or left slippage conditions fall in, respectively. These slippage conditions are determined by the wheel slippage value S and a rear wheel speed difference respectively. The rear wheel speed difference is defined by a difference in wheel speed with respect to time (e.g., 30 msec.), or rear wheel acceleration. According to the braking range thus determined, desired braking pressure modification rates are calculated to derive duty ratios of control signals to the pressure intensifying valves 36c and 36d or the pressure reducing valves 37c and 37d respectively. The braking fluid pressure is supplied from the second accumulator unit AU2 to the rear wheel cylinders 33 and 34 for reducing driven wheel slippages at the right and left rear wheels respectively to within a preselected allowable range.

Under the TCS throttle control, when the wheel slippage value S during acceleration exceeds a preselected slippage threshold value which may be set to the same value as in the TCS braking control or to a different value therefrom, the slippage condition is compared with a target slippage condition to determine a desired throttle valve opening degree and a throttling rate. The target throttle opening degree DKR is input to the throttle control module 71 in the TCS/ABS-ECU 50 so that the motor driving current IM is applied to the throttle motor 18. The throttle motor 18 then moves the second throttle valve 21 to modify an air/fuel mixture, decreasing driving force transmitted to the driven wheels 70 and 75 so that the wheel slippage falls within a preselected allowable range.

In operation of determining the wheel slippage value S, when the front-right and front-left wheel speed sensors 1 and 2 are normally operating, the compliance wheel speed difference $D_F$ which is below the threshold value $T_F$ is created due to the difference in turning radius between outside and inside wheels or the difference in diameter between right and left tires, for example. Therefore, in step 330, as shown in FIG. 3, the compliance wheel reference speed $V_F$ is determined by the average of the front-right wheel speed $V_{FR}$ and the front-left wheel speed $V_{FL}$. Even when either one of the front-right and front-left wheel speed sensors 1 and 2 represents a sensor value greater than an actual compliance wheel speed due to the turning radius difference or the tire diameter difference, the averaging the front-right wheel speed $V_{FR}$ and the front-left wheel speed $V_{FL}$ to get the compliance wheel reference speed $V_F$ reduces an error over the actual compliance wheel speed by half. This prevents the slippage value S from being determined to be smaller than an actual value, which may be caused by selecting a greater wheel speed to derive the compliance wheel reference speed. Thus, driving forces applied to the rear wheels 70 and 75 (i.e., the driven wheels) are reduced properly to restrict wheel slippage, assuring traveling stability during acceleration.

When failure occurs in either one of the front-right and front-left wheel speed sensors 1 and 2 due to wire breakage or short circuit, for example, a sensor value from the defective wheel speed sensor becomes about zero with the result that tile compliance wheel speed difference $D_F$ becomes greater than the threshold value $T_F$ for the preselected period of time $T_t$. Thus, in step 340, as shown in FIG. 3, the compliance wheel reference speed $V_F$ is determined by subtracting the correction value $\alpha$ from the greater one of the front-right wheel speed $V_{FR}$ and the front-left wheel speed $V_{FL}$. It will be appreciated that when either one of the front-right and front-left wheel speed sensors 1 and 2 breaks down, a greater sensor value from the normally operating sensor is used to determine the compliance wheel reference speed $V_F$. This prevents the slippage value S from being determined to be much greater than an actual value, which may be caused by averaging the front-right wheel speed $V_{FR}$ and the front-left wheel speed $V_{FL}$ to derive the compliance wheel reference speed $V_F$ when the failure occurs in the sensor. Thus, driving forces transmitted to the driven wheels are controlled to assume proper acceleration characteristics.

As described above, in step 340, when the Failure occurs in either one of the front-right and front-left wheel speed sensors 1 and 2, the compliance wheel reference speed $V_F$ is determined by subtracting the correction value $\alpha$ from the greater one of the front-right wheel speed $V_{FR}$ and the front-left wheel speed $V_{FL}$. The reasons for providing the correction value $\alpha$ will be described hereinafter with reference to FIG. 4.

Figure 4:
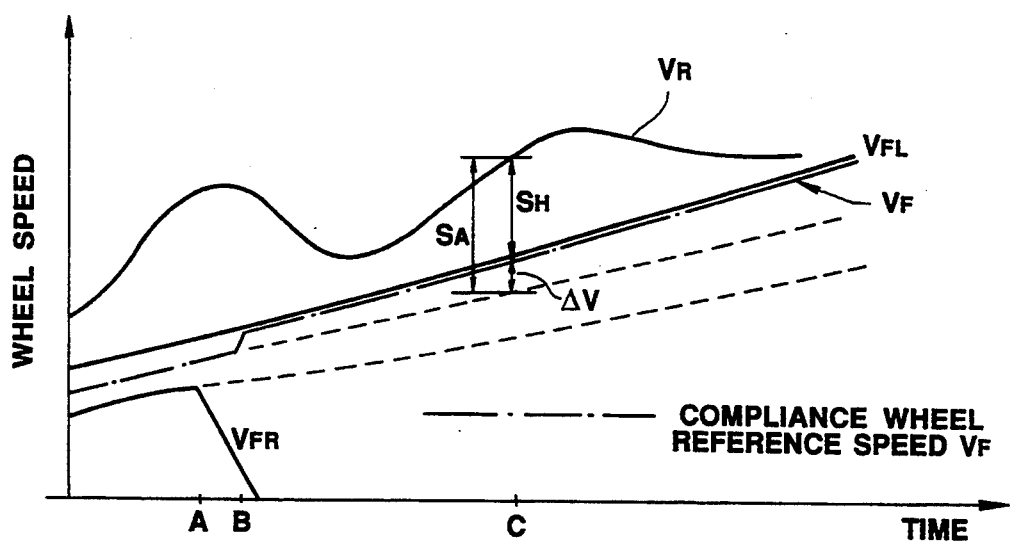
FIG. 4 is a graph which shows a relation among front-right wheel speed $V_{FR}$, front-left wheel speed $V_{FL}$, compliance wheel reference speed $V_F$, and driven wheel speed $V_R$.

FIG. 4 shows the relation among the front-right wheel speed $V_{FR}$, the front-left wheel speed $V_{FL}$, the compliance wheel reference speed $V_F$, and the driven wheel speed $V_R$.

Assuming that when a vehicle turns to the right with acceleration, short circuit occurs in the front-right wheel speed sensor 1 of the front-right wheel 60 (i.e., an inside wheel) at a time A, the front-right wheel speed $V_{FR}$ is then decreased gradually to about zero (km/h). When the condition where the compliance wheel speed difference $D_F$ greater than the threshold value $T_F$ is maintained for the preselected period of time $T_t$ is met at a time B while the front-right wheel speed indicative signal value $V_{FR}$ is decreased, due to the failure in sensor 1 the compliance wheel reference speed $V_F$ is, as shown by a dashed line, changed from the average value of the front-right and front-left wheel speeds $V_{FR}$ and $V_{FL}$ to the front-left wheel speed $V_{FL}$ greater than the front-right wheel speed $V_{FR}$.

As a result, at a time C after a certain period of time, the wheel slippage value S represents a value $S_H$ smaller than a value $S_A$ indicative of the wheel slippage value S when the wheel speed sensors are normally operating.

Therefore, a difference $\Delta V$ between the wheel slippage values $S_A$ and $S_H$ is established so that the wheel slippage value $S_H$ when the failure occurs in the wheel speed sensors is determined to be smaller than an actual wheel slippage value. The driving force restricting control thus becomes insufficient for resuming traction at the driven wheels.

For The above reasons, in step 340, the correction value $\alpha$ is provided for compensating the difference $\Delta V$ between the wheel slippage values $S_A$ and $S_H$. The correction value $\alpha$, as mentioned above, may be set to a constant which corresponds to one-half of a maximum value of the compliance wheel speed difference $D_F$ which may be created during normal operation of the sensors. In this case, The wheel slippage value S is determined to be slightly greater than an actual wheel slippage value under any turning conditions, however, will not adversely affect traction and steering operations. Alternatively, the correction value $\alpha$ may be set to a variable which represents about zero when the vehicle travels straight and increases according to increase in the compliance wheel speed difference $D_F$ during turning. In this case, the correction value $\alpha$ is substantially the same as the difference $\Delta V$ so that the wheel slippage value $S_A$ is nearly equal To The wheel slippage value $S_H$. Therefore, a proper slippage value is obtained for assuring traveling stability and desired acceleration characteristics.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, while the traction control system of this invention includes the TCS throttle control and the TCS braking control, it may be applicable to a system capable of performing fuel control, ignition timing control, and/or split engine control for operating a multi-cylinder engine using only some of the cylinders under light load conditions.

What is claimed is:

1. A traction control system for an automotive vehicle, comprising:

compliance wheel speed sensor means for detecting wheel speeds of right and left compliance wheels, respectively;

drive wheel speed sensor means for detecting wheel speeds of right and left drive wheels, respectively;

means for deriving a compliance wheel speed difference between the detected right and left compliance wheel speeds;

means for selecting a higher one of the detected right and left compliance wheel speeds as a compliance wheel reference speed when the derived compliance wheel speed difference is above a preselected threshold value for a preselected period of time, and for selecting an average of the detected right and left compliance wheel speeds as said compliance wheel reference speed when the derived compliance wheel speed difference is below said preselected threshold value;

means for calculating a slippage value of the drive wheel on the basis of a difference between the detected drive wheel speed and the compliance wheel reference speed; and traction control means for controlling a driving force transmitted to each of said drive wheels so that a calculated average slippage value is maintained within a preselected slippage threshold by adjusting an opening degree of a motor-driven throttle value.

2. The traction control system as set forth in claim 1, wherein said compliance wheel reference speed is determined by modifying the selected higher one of the detected compliance wheel speeds by a preselected correction value.

3. The traction control system as set forth in claim 2, wherein said compliance wheel reference speed is determined by subtracting said preselected correction value from the selected higher one of the detected compliance wheel speeds.

4. The traction control system as set forth in claim 3, wherein said preselected correction value is set at a constant value which corresponds to one-half of a maximum value of said compliance wheel speed difference.

5. The traction control system as set forth in claim 3, wherein said preselected correction value is set to zero when the vehicle is being driven in a straight-ahead direction, and variably set to increase in accordance with an increase in said compliance wheel speed difference when the vehicle is turned.

* * * * *